W. L. RANDOLPH.
Sewer-Trap.

No. 227,130. Patented May 4, 1880.

Attest  
H. W. Fuller  
T. Young

Inventor.  
W. L. Randolph  
by Earle H. Smith atty

UNITED STATES PATENT OFFICE.

WILLIAM L. RANDOLPH, OF BROOKLYN, NEW YORK.

SEWER-TRAP.

SPECIFICATION forming part of Letters Patent No. 227,130, dated May 4, 1880.

Application filed July 9, 1879.

*To all whom it may concern:*

Be it known that I, WM. L. RANDOLPH, of Brooklyn, Kings county, New York, have invented certain new and useful Improvements in Anti Gas and Backwater Sewer-Traps, whereof the following is a specification.

My invention relates to traps whose object is to prevent backwater and escape of gas from sewers; and my improvement also prevents what has been known as "siphonage," which divests such traps of their necessary quantum of water and interferes with their proper action.

My improvement consists, essentially, in the combination, with an $\infty$-trap, of two self-acting valves, both opening upward and closing by their own gravity, adapted for operation substantially as hereinafter described.

Figure 1:
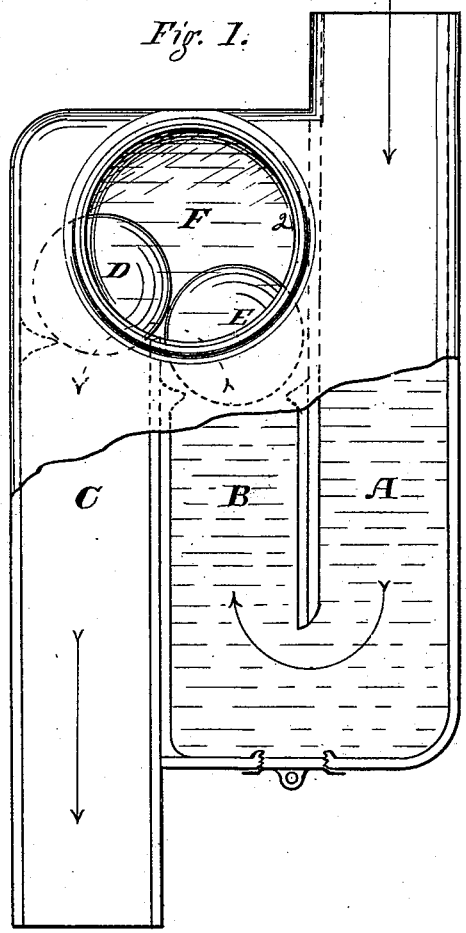
Figure 3:
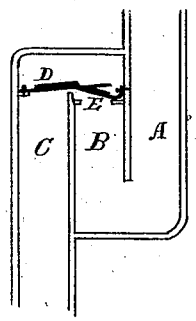
Figure 2:
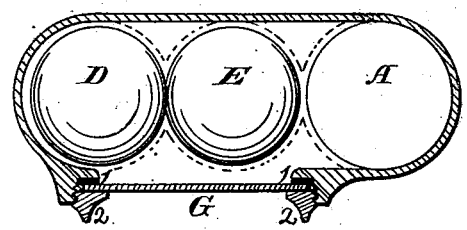

In the annexed drawings, which represent a trap embodying my improvements, Figure 1 is a side elevation and partial section; Fig. 2, a horizontal sectional view, taken through the removable plate opposite the valves. Fig. 3 is a modification.

The trap may be described as comprising three chambers, A B C, of which A is the inlet-pipe, C the discharge or outlet, and B a middle chamber, consisting of a return-pipe to the inlet A, and opening into it near the bottom, as shown, so that the two, A B, may be viewed as a siphon inverted.

At the orifice leading from the trap into the outlet C, I form a valve-seat, and I also form a valve-seat upon the orifice leading into the trap from the inlet pipe or chamber A. These valve-seats will be determined in form by the kind of valve used thereon.

The inlet-valve seat in the arrangement shown in the drawings, and which I have tried with success, is placed at a lower point in the trap than the outlet-valve seat.

D E are the valves, in this instance of globe form, though other forms may be made to answer.

The disposition of the valve-seats, as shown in the drawings, is adapted for placing the discharge-valve D above the inlet-valve E, and in such relation to the latter that the inlet-valve, which acts first as the water enters the trap, will, on yielding to the action of the incoming water, impinge on the valve D, tilting it from its seat, and thus opening the discharge-orifice. Fig. 1 shows the inlet-valve E as having left its seat and in the act of operating the valve D in this manner. In the modification, Fig. 3, flat valves are shown arranged to work on the same plan.

The invention is not confined to any particular form of valves.

It will be understood from the foregoing that the valves are operated to lift them from their seats by the action of the water in process of discharge toward the sewer, and that they resume their seats by gravity; also, that one of the valves opens in the direction of the course of the water and the other opens in a direction contrary thereto.

This arrangement and combination not only prevent backwater from the sewer and escape of gas through the trap, but also prevent siphonage—that is, the emptying of the trap of its necessary complement of water by flow of water through waste-pipes having the junction below the trap, as the tendency in this trap in such case is to draw the outlet-valve D tighter to its seat.

Near the place of the valves in the trap I form an opening, F. By means of this opening the valves D E are inserted in their places, and access may be had to them when the trap is in use without disturbing the connections of the inlet and outlet pipes with the trap. This opening I close with a cap or plate, G, and to enable any one to observe the operation of the valves, so as to ascertain their action and to discover any possible derangement that might occur, I make the plate of a transparent material—glass, for example. A packing, 1, is placed under the edge of the plate, and a ring, 2, is screwed down over the plate to hold it in place.

Instead of placing the opening F at the side of the valves, it may be placed over them, and in one modification I make the top of the trap removable for access to the valves.

I claim as my invention—

A sewer-trap comprising substantially three chambers, whereof the middle and outer one on the inlet side form a siphon inverted, and the middle and outer one on the outlet side are each provided with valves, both of which open upward and close by their own gravity.

WM. L. RANDOLPH.

Witnesses:
EARLE H. SMITH,
H. W. FULLER.